US012734024B2

(12) United States Patent
Wolfer et al.

(10) Patent No.: US 12,734,024 B2
(45) Date of Patent: Sep. 15, 2026

(54) ORAL CARE MOUTHPIECE CONNECTED TO LARGER MASS FOR INCREASED VIBRATION

(71) Applicant: KONINKLIJKE PHILIPS N.V., Eindhoven (NL)

(72) Inventors: Jay Wolfer, Kirkland, WA (US); Regan Starkey Foster, Lynnwood, WA (US); Anandh Balakrishnan, Tulalip, WA (US); Gregory Russ Goddard, Kenmore, WA (US); Scott E. Hall, Issaquah, WA (US); Kelly Laurence Hirsch, Bothell, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 328 days.

(21) Appl. No.: 18/272,608

(22) PCT Filed: Jan. 17, 2022

(86) PCT No.: PCT/EP2022/050820
§ 371 (c)(1),
(2) Date: Jul. 17, 2023

(87) PCT Pub. No.: WO2022/157088
PCT Pub. Date: Jul. 28, 2022

(65) Prior Publication Data

US 2024/0293212 A1 Sep. 5, 2024

Related U.S. Application Data

(60) Provisional application No. 63/139,729, filed on Jan. 20, 2021.

(51) Int. Cl.
*A61C 17/22* (2006.01)
*A61C 17/34* (2006.01)

(52) U.S. Cl.
CPC .......... *A61C 17/222* (2013.01); *A61C 17/228* (2013.01); *A61C 17/3481* (2013.01)

(58) Field of Classification Search
CPC ....... A46B 9/045; A61C 17/20; A61C 17/222; A61C 17/228; A61C 17/3481
See application file for complete search history.

(56) References Cited

U.S. PATENT DOCUMENTS 8,745,802 B2 6/2014 Steur
10,143,296 B2 12/2018 Yoo
(Continued)

FOREIGN PATENT DOCUMENTS

KR 20190118778 A * 10/2019 ............. A46B 9/045

OTHER PUBLICATIONS

International Search Report and Written Opinion Dated Apr. 20, 2022 for International Application No. PCT/EP2022/050820 Filed Jan. 17, 2022.

*Primary Examiner* — Shay Karls

(57) ABSTRACT

In a device that includes a vibrating mouthpiece, a source of vibratory movement is connected to a relatively large, relatively stationary mass, or anchor, so the equal and opposite vibrational momentum of the handpiece (plus large mass) results in very little vibrational amplitude of the handpiece-plus-mass, while the active mouthpiece has high vibrational amplitude. In an example, a mouthpiece which engages with a part of a dental arch, is actively cleaning, while a block on the other side of the dental arch acts to anchor the vibration source to the much larger mass of the user's jaw (and head). When the user's jaws grip the block, there will be very little vibration of the handpiece or the user's teeth-jaw-head mass and consequently, the mouth- (Continued)

piece will vibrate at a greater amplitude than it would without the anchor. This leads to greater efficiency of the device.

14 Claims, 4 Drawing Sheets

(56) References Cited

U.S. PATENT DOCUMENTS

| | | | | |
|---|---|---|---|---|
| 10,314,679 | B2 | 6/2019 | Blank et al. | |
| 2010/0143863 | A1* | 6/2010 | Lin | A61C 17/20 433/87 |
| 2012/0040300 | A1 | 2/2012 | Levens et al. | |
| 2012/0322018 | A1 | 12/2012 | Lowe et al. | |
| 2019/0021816 | A1 | 1/2019 | Furtenhofer et al. | |
| 2019/0374812 | A1 | 12/2019 | Mcghee | |
| 2020/0138180 | A1* | 5/2020 | Arbeitman | A61C 17/222 |

* cited by examiner

ORAL CARE MOUTHPIECE CONNECTED TO LARGER MASS FOR INCREASED VIBRATION

This application is the U.S. National Phase application under 35 U.S.C. § 371 of International Application No. PCT/EP2022/050820, filed on Jan. 17, 2022, which claims the benefit of U.S. Application Ser. No. 63/139,729, Filed Jan. 20, 2021. These applications are hereby incorporated by reference herein.

TECHNICAL FIELD

This invention relates generally to oral care devices, and more specifically to a tooth cleaning mouthpiece with vibrating bristles for cleaning the teeth.

BACKGROUND

Oral care vibratory mouthpieces can provide teeth cleaning much faster than a power toothbrush or manual toothbrush. A typical vibratory cleaning device includes a mouthpiece that covers the dental arch with bristles or other brush material, and an external vibratory source to excite the mouthpiece and vibrate the bristles so that all the teeth are cleaned at once. The vibratory source is typically a motor or other mechanical excitation source such as a pneumatic or hydraulic mechanism, enclosed in a housing that can serve as a handle for the device, due to its location and size.

The problem with this approach is that the mouthpiece vibratory amplitude is reduced when the handle also vibrates. This is due to reaction forces associated with the vibratory method located inside the handle. Any vibratory energy lost to the handle or user's hand reduces the efficacy of the cleaning process because the mouthpiece and bristles will have lower vibration amplitude.

SUMMARY

In an embodiment, the source of vibratory movement is connected to a relatively large, relatively stationary mass, or anchor, so the equal and opposite vibrational momentum of the handpiece (plus large mass) results in very little vibrational amplitude of the handpiece plus mass, while the active mouthpiece has high vibrational amplitude. In an example, a mouthpiece which engages with a part of a dental arch, is actively cleaning, while a block on the other side of the dental arch acts to anchor the vibration source to the much larger mass of the user's jaw (and head). When the user's jaws grip the block, there will be very little vibration of the handpiece or the user's teeth-jaw-head mass and consequently, the mouthpiece will vibrate at a greater amplitude than it would without the anchor. This leads to greater efficiency of the device.

In an embodiment, a device for use inside the oral cavity of a user includes a vibration source: a tooth-engagement piece which is coupled to the vibration source and adapted to engage with a first plurality of a user's teeth, and a coupling device adapted to couple the vibration source to a mass which is larger than the mass of the tooth engagement piece which, while the device is in use, absorbs vibrational energy. The vibration source may be an eccentric rotating mass motor.

In an embodiment, the treatment is a cleaning treatment, and the tooth-engagement piece includes a plurality of bristles that contact the user's first plurality of teeth while in use. The tooth engagement piece may include a plurality of walls forming a trough adapted to fit over the first plurality of teeth, with the bristles extending from the interior walls of the trough.

In an embodiment the coupling device includes a magnetic coupler adapted to couple the vibration source to a stationary structure outside of the user's mouth. In another embodiment, the block is configured to couple the vibration source to the user's head during use.

In an embodiment, the coupling device includes a block configured to be held between a second set of a user's teeth during use. The tooth engagement piece may be configured to engage a plurality of teeth that do not include the second set. The block may be coupled to the vibration source with a mechanically stiff coupling. The block may have a vertical dimension that is greater than the vertical dimension of the horizontal member of the tooth engagement piece.

In an embodiment, the tooth engagement piece includes a plurality of walls forming a trough adapted to fit over a portion of the user's dental arch with a first end in proximity to the user's molar and a second end extending beyond the midpoint of the dental arch.

In an embodiment, a method for providing vibrational motion to a mouthpiece includes coupling a vibratory motion source to the mouthpiece; providing an element configured to couple the vibratory motion source to an anchor which is stationary relative to the mouthpiece, the anchor having a mass larger than the mass of the mouthpiece and vibratory motion source; and providing a switch to activate the vibratory motion source. The anchor may be the user's skull. The element configured to couple the vibratory motion source to an anchor may include a block adapted to be held between user's teeth in the upper and the lower dental arch.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the inventive subject matter.

DETAILED DESCRIPTION

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

Figure 1:
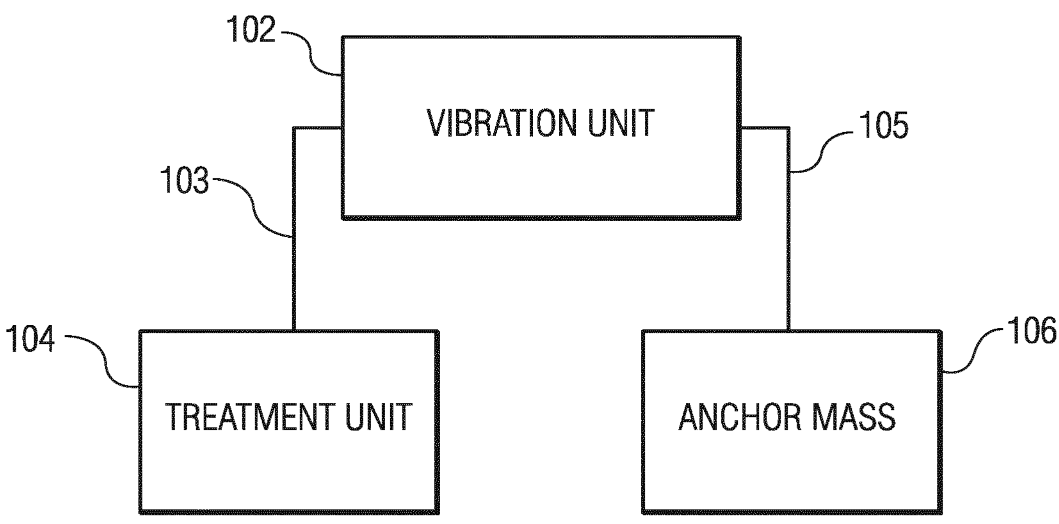
FIG. 1 is a schematic diagram of an embodiment of the invention.

Referring to FIG. 1, an embodiment includes a vibration unit 102 that is mechanically coupled to a tooth treatment unit 104 and, when in use, to an anchor 106. The vibration unit 102 produces vibratory motion that is transferred via a first stiff mechanical coupling 103 to the treatment unit 104 and via a second stiff mechanical coupling 105 to the anchor 106. During use, the treatment unit 104 is placed inside the user's oral cavity to provide a treatment, such as, for example, a teeth cleaning, an orthodontic treatment, gum massage, interdental cleaning; or any other treatment inside the oral cavity that uses a vibrating motion. The anchor 106 is a mass that is stationary with respect to the treatment unit and sufficiently large so as to vibrate little or not at all in response to vibration of the vibration unit 102.

Figure 2:
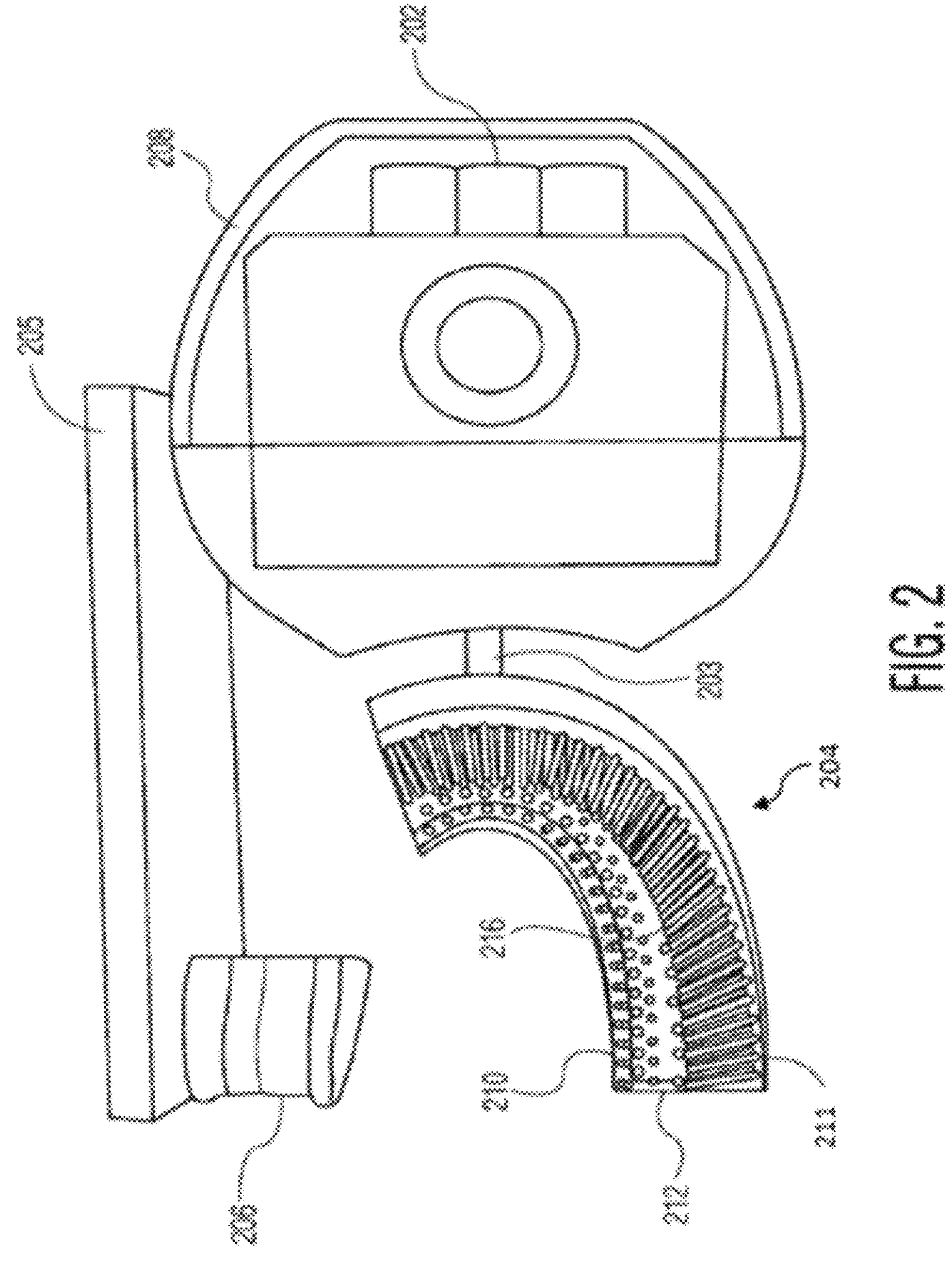
FIG. 2 is a top view of an embodiment.

FIG. 2 illustrates an example suitable for use as a tooth cleaner. In this example, the vibration source 102 includes a vibrating motor 202 inside a housing 208. The housing 208 may serve as a handpiece. The vibratory motor may be an eccentric rotating mass motor or any other mechanism that produces a vibrating motion. Other examples of vibration sources include a motor rotating cables with eccentric "cogs" distributed in the active mouthpiece: or cables arranged inside the mouthpiece in a push-pull fashion, where one side of the bristle field is pulled toward the motor while the other side is pushed away. The motor 202 is powered by a battery, which may be rechargeable.

In FIG. 2, the treatment unit 104 is a teeth cleaning mouthpiece 204. The mouthpiece 204 is mechanically coupled to the motor 202 via a rigid coupling 203. The mouthpiece 204 has two vertical sidewalls 210, 211 extending from an intermediate horizontal member 212. The sidewalls and horizontal member in the illustrated embodiment form an H-shaped cross section so that the mouthpiece may engage both upper and lower teeth simultaneously. The mouthpiece 204 may include bristles 216 extending from the interior of the sidewalls 210, 211 to engage the teeth and vibrate against them when excited by the vibratory energy coming from the motor 202. The vibrating motion of the bristles provides the cleaning action of the mouthpiece.

When viewed from the top, the mouthpiece 204 is configured as J-shaped, with dimensions that allow it to be placed over one side of the dental arches in order to clean that portion, and then flipped and moved to the other side of the arches to clean that side. The J-shape piece extends over more than half of the dental arch, extending from the rear of the dental arch to a point past the midline of the dental arch. By extending past the midline, complete treatment of the front teeth is assured.

In the example of FIG. 2, the anchor or stationary mass may include a block 206 that during use, is held between upper and lower teeth on the opposite side of the dental arch from that portion engaged by the mouthpiece 204. The block 206 is coupled to the vibration motor unit, which includes a motor 202 in a housing 208, with a stiff structural element 205 mounted to the housing 208 so that there is no vibration or greatly reduced, vibration of the motor unit/block system close to the excitation frequency of the mouthpiece 204. The mouthpiece is coupled to a shaft 203 from the motor 202 which transfers motion from the motor to the mouthpiece.

Figure 4:
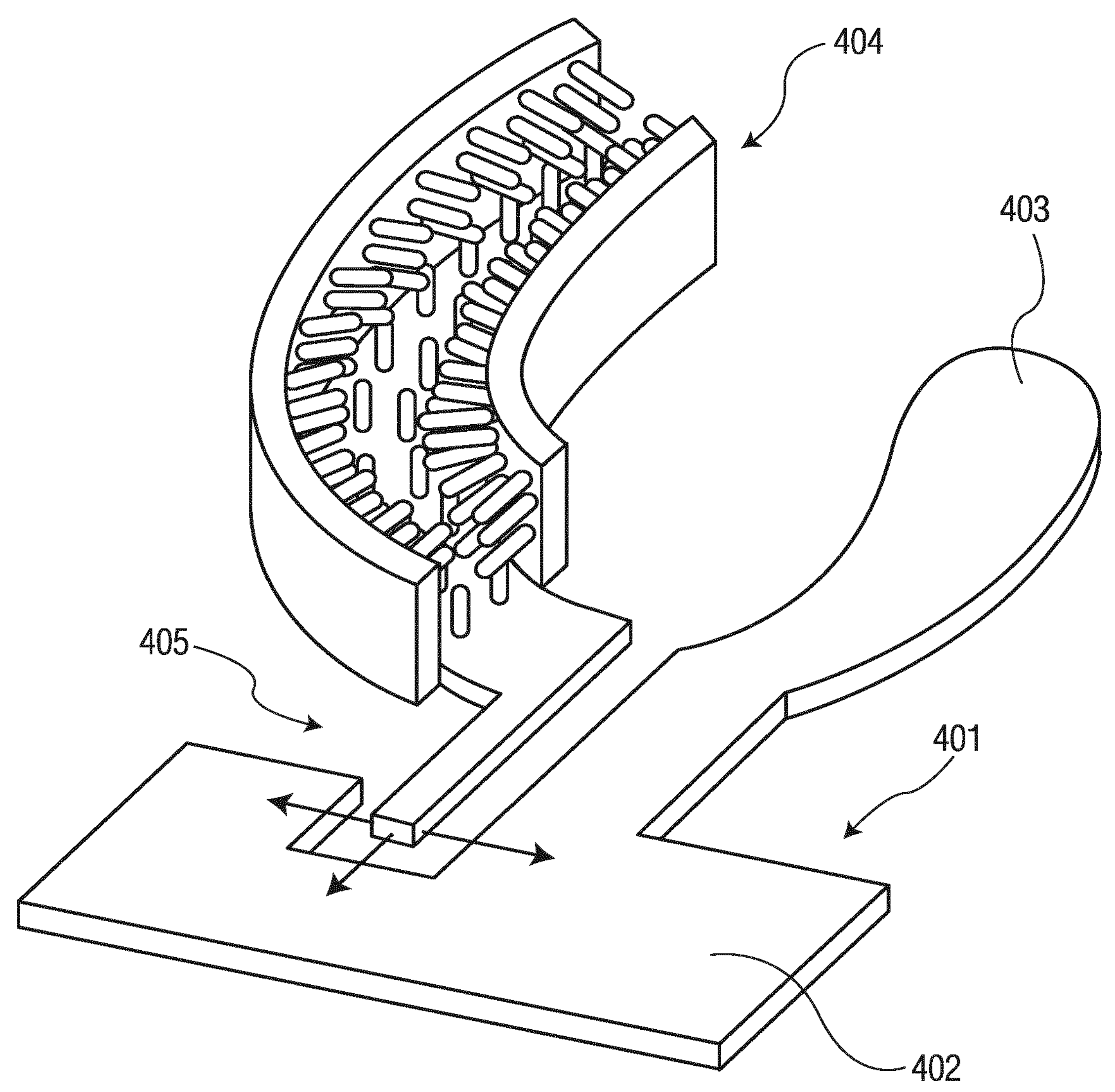
FIG. 4 is a perspective view of another embodiment.

FIG. 4 illustrates another example of a structural arrangement for coupling the bite block to the motor. In this example, a rigid substrate 401 has a first region 402 that would be positioned inside a housing, and a second region 403 that extends from the first region 402 out of the housing so as to be in a position between upper and lower teeth of the user when in use. The motor would be mounted on the first region 402 of the substrate 401, and a bite block would be mounted to the second region 403 of the substrate 401. Alternatively, the second region 403 of the substrate 401 could be shaped and sized in a manner that would allow it to be held firmly and comfortably between upper and lower teeth. The J-shaped mouthpiece 404 has a stem 405 extending therefrom which is connected to the motor, with the motor imparting motion to the mouthpiece 404 via the stem 405. In the illustrated embodiment, the substrate 401 forms the rigid coupling between the motor and the bite block.

When held in place by the biting force of the user, the block 206 acts to anchor the housing and the motor to the much larger mass of the user's jaw and head. This causes the mouthpiece 204 to have significant vibration amplitude, while there will be relatively little vibration of the housing or the user's teeth-jaw-head mass.

The block 206 is a piece having dimensions and shape that are suitable for engagement between a subset of the upper and lower teeth, allowing it to be held firmly between upper and lower teeth. It is made from a material suitable for use in the mouth, which may be slightly resilient for user comfort while being held firmly between the upper and lower jaw. The vertical dimension of the block 206 is greater than the vertical measurement of the horizontal member of the mouthpiece so that, while upper and lower teeth are in contact with the block, there is sufficient space between the upper and lower dental arch to accommodate the mouthpiece while allowing a space for vibratory motion of the mouthpiece against the chewing surfaces of the teeth.

In the embodiment of FIG. 2, the block provides a stiff coupling between the vibration unit and a mass that is both large and stationary relative to the mouthpiece, i.e., the user's head. Due to conservation of momentum, the relatively large mass of the block+user's head and the relatively small mass of the mouthpiece will have the same vibratory momentum, but the peak-to-peak displacement of the larger mass will be negligible due to the ratio of masses involved. In any embodiment that couples the vibration unit to a much larger and stationary mass, the mouthpiece will vibrate with higher amplitude relative to the bite block and anchor mass, and therefore have better cleaning efficacy.

The motor 202 can be configured to provide rotational vibration to the mouthpiece 204, linear vibration or other types of vibration at the same time. Since the block is connected to a large mass by virtue of the user biting down on the block, the housing and block will have very little vibration compared to the active mouthpiece.

In the example of FIG. 2, the user inserts the device in their mouth, bites down firmly on the block, and then activates the motor. After a few second, the user flips the device over to clean the other side of the dental arches, following the same process as with the first side. In this embodiment, the mouthpiece is symmetrical about a horizontal plane lying within the vertical midpoint of the horizontal member so that both sides are identical, and it will operate in the same manner with respect to the teeth when flipped in this manner.

Figure 3:
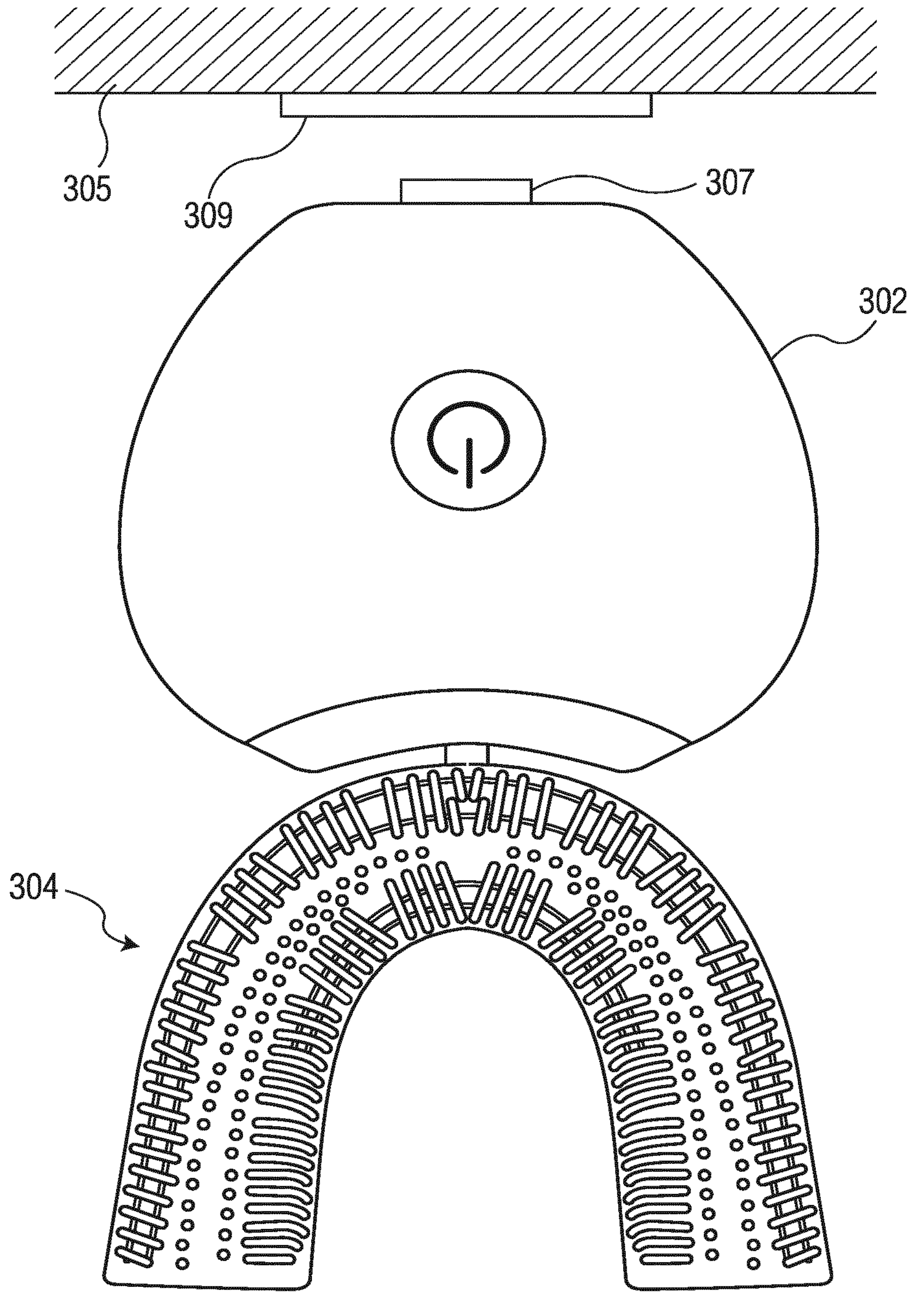
FIG. 3 is a top view of another embodiment.

In another example illustrated in FIG. 3, the vibration unit 302 is rigidly coupled to a treatment unit 304 which may be a mouthpiece that engages all or a portion of the dental arch. The vibration unit 302 has a coupling that can be attached and detached to a stationary object or structure 305 in the user's environment such as a wall, a support pole or other fixture. With stiff coupling between the vibration unit 302 and the stationary structure 305, and the vibration unit 302 and the mouthpiece 304, the mouthpiece will be more efficiently and effectively excited for vibratory movement. In this example, the device could be coupled to a bathroom wall or fixture with a reversable connecting mechanism such as a magnetic coupling. In this example, one or more rare-earth magnets 307 on the housing would allow the user to place the housing/motor assembly on a metal plate mounted 309 to the wall or fixture, at the right height so they could walk up to it and position a full or partial mouthpiece in their mouth. The magnet or magnets 307 and their configuration are chosen to provide a stiff coupling to the plate 309. A similar magnetic approach could also be used with a stationary fixture 305 made up of a ferromagnetic material, without the need for mounting a plate to the fixture. In another example, the device could be attached with a suction cup or similar mechanism to, for example, a mirror or ceramic tile which is attached to a wall.

Treatment devices as illustrated and described above may have a longer battery life because no energy is lost in unwanted vibratory modes. It may provide better cleaning or other treatment in a shorter amount of time because of the more effective movement of the mouthpiece or other treatment providing element. In the example shown in FIG. 2, the bite block or similar feature allows for true hands-free operation of a mouthpiece tooth cleaner with high efficacy. The example shown in FIG. 3 also allows for hands-free operation for a full mouth cleaning process.

For embodiments that use a block to anchor the vibration unit, the bite block can also be used to establish the proper spacing of the top and bottom teeth on the other side of the mouth so that the vibrating mouthpiece provides optimal cleaning. Such embodiments may be more comfortable to use, as a user may find it more comfortable to insert a block and partial mouthpiece than a conventional full mouthpiece that engages the entire dental arch.

Other embodiments could use a "headband" approach where the handpiece is connected to a rigid band that is adjusted to be tight around the head (similar to how hard hats are held on). In this case, the user would put on the headband, tighten it, then attach the motorized handpiece to a stiff arm coming off the adjustable headband.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the treatment unit is an orthodontic device, or where other mechanisms for anchoring the vibration unit to the mass of the user's head or to an external stationary structure are used. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage. Any reference signs in the claims should not be construed as limiting the scope of the claims.

We claim:

1. A device for use inside the oral cavity of a user comprising:

a vibration source;

a tooth-engagement piece adapted to engage with a first plurality of a user's teeth, said tooth-engagement piece being coupled to the vibration source; and a coupling device adapted to couple the vibration source to a mass larger than the mass of the tooth engagement piece which, while the device is in use, absorbs vibrational energy, wherein the coupling device includes a block configured to be held between a second set of the user's teeth during use.

2. The device of claim 1, wherein the use is cleaning, and the tooth-engagement piece comprises a plurality of bristles that contact the user's first plurality of teeth while in use.

3. The device of claim 1, wherein the block is adapted to be held between the user's teeth in the upper and the lower dental arch during use.

4. The device of claim 3, wherein the tooth engagement piece is configured to engage a plurality of teeth that do not include the second set.

5. The device of claim 3, wherein the block is coupled to the vibration source with a mechanically stiff coupling.

6. The device of claim 3, wherein the block (206) is configured to couple the vibration source to the user's head during use.

7. The device of claim 3, wherein the tooth engagement piece includes an intermediate horizontal member, and wherein the block has a vertical dimension that is greater than the vertical dimension of the intermediate horizontal member of the tooth engagement piece.

8. The device of claim 1 wherein the vibration source includes an eccentric rotating mass motor.

9. The device of claim 2, wherein the tooth engagement piece includes a plurality of walls forming a trough adapted to fit over the first plurality of teeth, and wherein the bristles extend from the interior walls of said trough.

10. The device of claim 9, wherein the first plurality of teeth includes teeth in a user's upper dental arch and in the user's lower dental arch.

11. The device of claim 1, wherein the tooth engagement piece includes a plurality of walls forming a trough adapted to fit over a portion of the user's dental arch with a first end in proximity to the user's molar and a second end extending beyond the midpoint of the dental arch.

12. A method for providing vibrational motion to a mouthpiece comprising:

coupling a vibratory motion source to the mouthpiece;

providing an element configured to couple the vibratory motion source to an anchor which is stationary relative to the mouthpiece, the anchor having a mass larger than the mass of the mouthpiece and vibratory motion source, wherein the element includes a block configured to be held between a second set of a user's teeth during use; and providing a switch to activate the vibratory motion source.

13. The method of claim 12 wherein the anchor is the user's skull.

14. The method of claim 12 wherein the block is adapted to be held between the user's teeth in the upper and the lower dental arch.

* * * * *